UNITED STATES PATENT OFFICE.

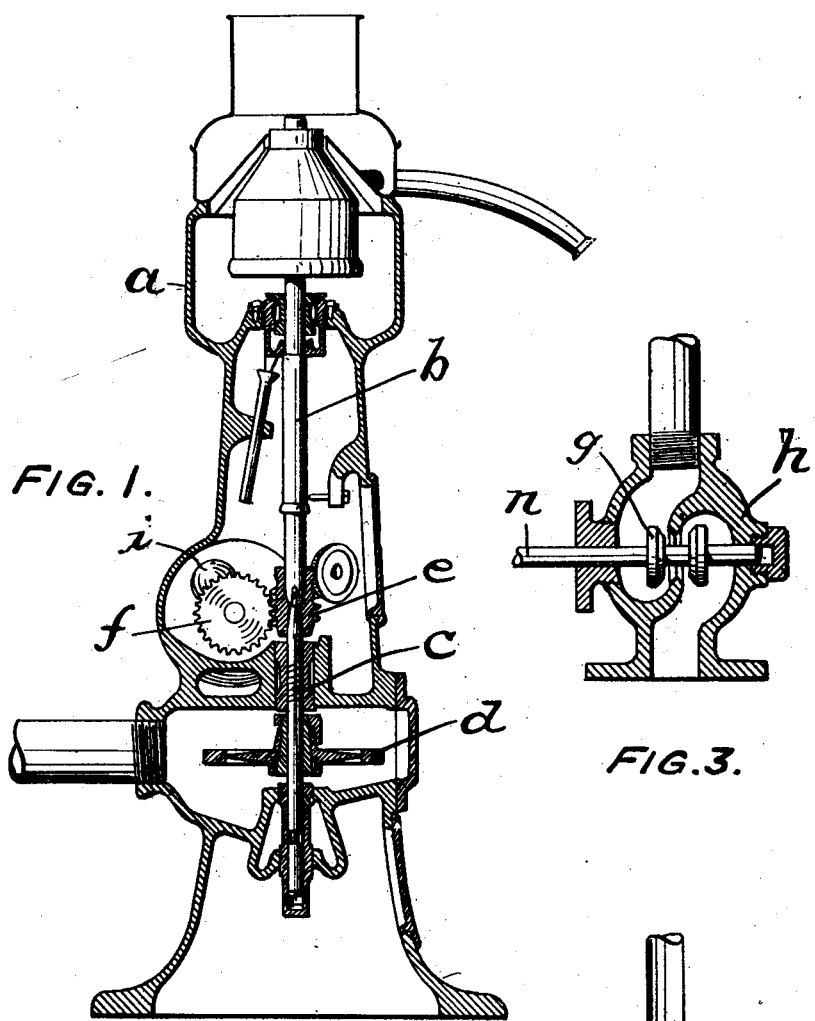
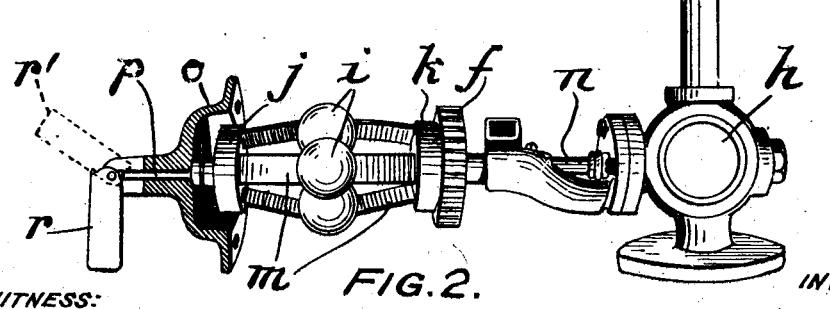

MEREDITH LEITCH, OF POUGHKEEPSIE, NEW YORK, ASSIGNOR TO THE DE LAVAL SEPARATOR COMPANY, OF NEW YORK, N. Y., A CORPORATION OF NEW JERSEY.

GOVERNOR FOR STEAM-DRIVEN CENTRIFUGAL MACHINES.

1,364,119.     Specification of Letters Patent.     Patented Jan. 4, 1921.

Application filed December 23, 1918. Serial No. 268,039.

*To all whom it may concern:*

Be it known that I, MEREDITH LEITCH, a citizen of the United States, residing at Poughkeepsie, county of Dutchess, and State of New York, have invented new and useful Improvements in Governors for Steam-Driven Centrifugal Machines, of which the following is a full, clear, and exact description, reference being had to the accompanying drawings, which form a part of this specification.

My invention relates to governors for steam driven centrifugal machines.

The governors on some such machines are driven by gearing which, through carelessness of the attendant, is frequently left without lubrication and is therefore subject to excessive wear.

The object of my invention is to provide means to cause shutting off the steam in case of failure, because of wear or any other reason, of the means for driving the governor from the steam driven spindle.

In the accompanying drawings, which show a preferred embodiment of my invention:

Figure 1 is a vertical section of a steam driven centrifugal machine equipped with a governor.

Fig. 2 is a side view, partly in section, of the governor.

Fig. 3 is a detail sectional view of the valve for controlling the supply of steam.

Referring first to Fig. 1: *a* is the frame of the machine, *b* the upper revolving spindle, and *c* the lower spindle driven by the steam wheel *d*. *e* is a spindle head having a worm cut in it to mesh with the worm wheel *f* and drive the centrifugal member of the governor, one ball *i* of which is seen in Fig. 1.

The valve comprises the stationary member or casing *h* and the moving member *g*, as shown in Fig. 2. When the latter is in a central position, the valve will be full open, but when it is at either end of its travel the valve will be closed. The centrifugal member of the governor comprises the balls *i*, the end heads *j* and *k* and the connecting spring arms *m*. The centrifugal member is connected by a stem *n* with the movable member of the valve. *o* is the governor cover, which is attached to the frame of the machine and carries a plunger *p* in line with the center of the governor and a cam *r* adapted to act on the end of the plunger.

With all parts in the positions shown, no steam can pass the valve and it would be impossible to start the machine. By raising the cam *r* to the position shown in dotted lines at *r'*, the plunger *p* will be forced inward and will force the head *j* inward, the balls *i* outward, and the valve toward the right to its central and open position.

The tension of the springs in the centrifugal member will press the plunger *p* against the cam *r* and cause sufficient friction to hold the cam in its high position. The machine may then be started. As the speed of the machine approaches normal, the centrifugal member will move the valve still farther to the right to shut off the steam and prevent excess speed. At the same time the pressure of the plunger *p* against the cam ceases, which allows the cam to fall to its lowest position. If now, for any reason, the centrifugal member ceases to revolve, the valve will be moved to the extreme left position, shut off the steam supply, and stop the machine.

Having now fully described my invention, what I claim and desire to protect by Letters Patent is:

1. In a governor for a centrifugal machine, the combination with a valve open in a central position and adapted to be closed by movement toward either end position, and a centrifugally operable device connected with and adapted to operate the valve, of a manually operable device adapted to move the centrifugally operable device into a speed position and through it move the valve from one end position to an open position and adapted to be held in operative position by the tension of the centrifugally operable device, said manually operable device adapted to be released upon the release of said tension as the speed increases.

2. In a governor for a centrifugal machine, the combination with a valve open in a central position and adapted to be closed by movement toward either end position, of a valve-operating centrifugal member comprising two rotatable disks, one free to move longitudinally and the other secured against longitudinal movement, a plurality of flat springs connecting said disks and holding them apart, weights carried by the springs, and a plunger and a cam adapted to be manually operated to force the first mentioned disk toward the second mentioned disk against the tension of the springs, said cam adapted to drop into inoperative position when centrifugal force acting on the weights removes the spring tension.

In testimony of which invention, I have hereunto set my hand, at Poughkeepsie, N. Y. on this 17th day of December, 1918.

MEREDITH LEITCH.